Jan. 31, 1950 N. R. KELLY 2,495,975

PREPLANNING DEVICE TO INDICATE A CAMERA FIELD

Filed June 27, 1945

INVENTOR
NORVAL R. KELLY
BY H. S. Grover.
ATTORNEY

Patented Jan. 31, 1950 2,495,975

UNITED STATES PATENT OFFICE 2,495,975

PREPLANNING DEVICE TO INDICATE A CAMERA FIELD

Norval R. Kelly, Great Neck, N. Y., assignor to Radio Corporation of America, a corporation of Delaware Application June 27, 1945, Serial No. 601,889

3 Claims. (Cl. 33—1)

The present invention relates to means for pre-planning the layout of a studio setting, especially a studio setting of the type used in the production of television programs.

The techniques employed in the televising of a scene differ considerably from those used, for example, in the making of motion pictures. This is especially true as regards the requirement for continuity of action. While in motion picture production it is customary to film on different days, or even weeks, scenes which follow one another on the screen in a matter of minutes, in television operation the action to be reproduced must be caught at the instant of its occurrence. Furthermore, each sequence must be initially correct. There are no opportunities for any "re-takes," or for resorting to a cutting room for editing. Consequently, a television production requires exact coordination of personnel, while accurate timing of sequences and split second movements of cameras are essential.

A live-talent television studio suitable for multi-set pickups is customarily designed so that the various sets or scenes are placed at one end of the studio. Control facilities are located at the opposite end, usually in a booth, affording a clear view of the studio for the control room staff. The main set or scene may occupy the space directly in front of the control booth, with any small sets supplementing the main set being placed along the side walls as near the main set as possible, and in such position as to minimize camera movements.

Rapid movement and control of the cameras in a television studio is of paramount importance. The number of cameras employed is usually not more than three, since each camera requires a separate rack of monitoring apparatus in the control booth. While camera design differs according to the type of production, a studio equipment may include, for example, one long-shot camera mounted on a regular motion picture type dolly to insure stable movements, and one close-up camera having a longer focal length lens. The latter camera is usually provided with a mobile pedestal mount.

In the actual presentation of a television production, the cameras move from place to place in order to pick up the desired shots in the proper sequence. Continuity is so planned that while one camera is taking the action, another camera is moving to a new location and composing a new shot to be switched on at the proper time. This frees the first camera, which can then move to a third location, and so on.

The various camera locations must be determined before the television production goes on the air, and this planning is customarily done during rehearsal. The camera distances and lens angles are worked out by experimentation until good composition is obtained. When a shot is finally worked out, that particular camera location is marked or otherwise indicated on the floor of the studio.

While the above-described method of determining camera locations is usually satisfactory insofar as visual results are concerned, it is an uneconomical procedure due to the fact that it ties up studio space and camera crews while the various experiments with camera placements are being made. Furthermore, it frequently becomes apparent during rehearsals that the design of a particular setting is unsuitable for whatever camera positions are practicable. This necessitates a redesign of that setting.

According to a feature of the present invention, means are provided for pre-planning the layout of a studio setting, including the camera placements best suited for each visual sequence, without tying up studio space and without employing the services of camera crews.

More particularly, the present invention, in a preferred embodiment, includes one or more measuring units, or gauges, for determining the width and height of a camera field at varying distances from the camera lens. The number of these measuring units or gauges employed in practicing the invention is dependent in part upon the number of camera lenses of different focal length to be used in a particular television production. Each measuring unit or gauge consists of a substantially triangular sheet of relatively thin transparent material. At one vertex of each measuring unit is formed an extending portion having represented in outline thereon a camera with a lens of a certain focal length, the lens of the camera being located approximately at the vertex of the gauge.

Each of the measuring units also includes three scales in a desired ratio, such, for example, as one-quarter inch to one foot. One of these scales is co-linear with the optical axis of the camera representation, and bisects that angle of the gauge at the vertex of which the camera representation appears. This particular scale indicates the distance from the camera lens to an objective.

Each measuring unit or gauge is so proportioned that the length of an imaginary straight line drawn within the boundaries of the triangular gauge and perpendicular to the distance scale, or, in other words, perpendicular to the optical axis of the camera, will indicate the width of the camera field at a distance from the camera lens determined by the point where such imaginary line crosses the distance scale. Since this imaginary line is terminated by the two edges of the triangular gauge forming the angle at the vertex of which the camera representation appears, a second scale is set forth along one of these edges, this second scale indicating numerically the width of the camera field (for a lens of a particular focal length) at a distance from the camera lens determined by the point where the imaginary line intersects the distance scale.

Also set forth on the triangular gauge, and associated with the two scales indicating the distance of an objective from the camera lens and the width of the camera field at that distance, is a third scale showing the height of the camera field at varying distances from the camera lens. All three of these scales are so integrated that the imaginary line drawn across the triangular gauge perpendicular to the optical axis of the camera and at a selected distance from the camera lens will indicate simultaneously the width and height of the objective field at the distance selected.

The triangular camera gauges described above are used in conjunction with a floor plan blank of the studio, drawn on a ratio substantially identical to that of the camera gauges. Various tentative settings or scenes are indicated on this floor plan blank, following which the camera gauges are placed upon the floor plan blank and maneuvered either singularly or in combination to give an exact index of the visual possibilities inherent in the settings.

When so employed, the camera measuring units or gauges of the present invention perform a dual function. On one hand, they enable the designer, in laying out settings and placing these settings in the studio, to determine whether or not particular set proportions and placements will allow the visual results which are required by the continuity of the production. The camera gauges also enable the designer to alter individual set designs or to rearrange set placements to accommodate necessary camera angles.

On the other hand, the camera gauges of the present invention, when employed in conjunction with floor plans which have been furnished by the scenic designer, permit the director of a production to plan a presentation shot-by-shot, and enable him to determine definitely where cameras are to be placed and the points to which they must be moved to bring about the visual sequences required. When so used, the present invention represents a considerable saving in time and facilities over conventional planning methods.

One object of the invention, therefore, is to provide means for pre-planning the layout of a studio setting.

Another object of the invention is to provide means for determining camera placements for a series of visual sequences, without using studio space and without requiring the services of camera crews.

An additional object of the invention is to provide a camera measuring unit or gauge so calibrated as to indicate, in a predetermined ratio, the distance of an objective from a camera lens, as well as the width and height of the camera field at any particular objective distance.

A still further object of the invention is to provide a studio floor plan blank in the same predetermined ratio as the camera gauges and for use in conjunction therewith, this floor plan blank being adapted to have experimental settings indicated thereon, whereby subsequent maneuvering of the gauges over the floor plan blank will indicate the visual possibilities of a particular experimental setting.

Other objects and advantages will be apparent from the following description of a preferred form of the invention and from the drawings, in which.

Figures 1, 2:
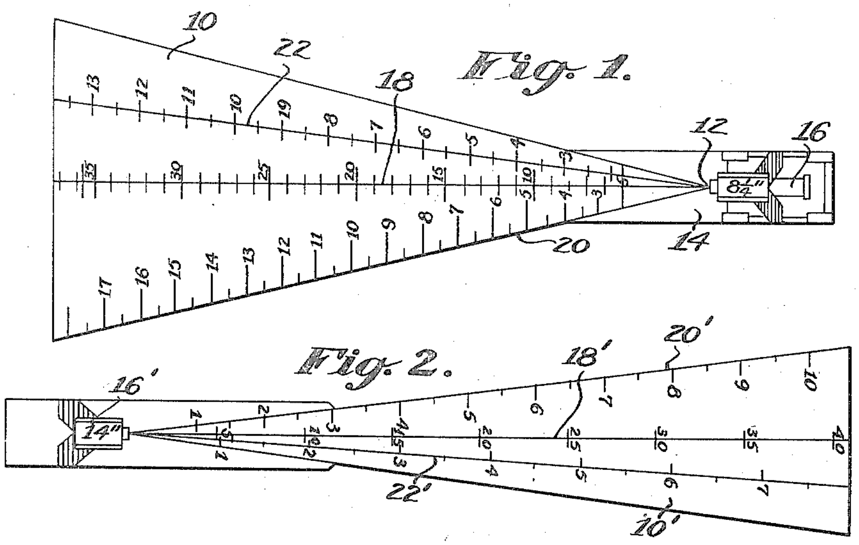
Fig. 1 is a plan view of a measuring unit or gauge in accordance with the present invention, designed for a camera having a lens of a selected focal length.
Fig. 2 is a plan view of a gauge of the type shown in Fig. 1, but designed for a camera having a lens of a different focal length.

Referring first to Fig. 1, there is shown a measuring unit or gauge generally indicated by the reference character 10, and designed for a camera having a lens of $8\frac{1}{4}$ inches focal length, for instance. Gauge 10 is preferably made of some suitable transparent material, such, for example, as plastic, and should be relatively thin, such as in the order of $\frac{1}{16}$ of an inch in thickness.

The shape of gauge 10 is substantially triangular, as shown in the drawing, except that at one vertex 12 of the gauge there is formed an extending portion 14. On this extending portion 14 is set forth in etched outline a representation 16 of a camera with a dolly mount, the lens of the camera representation 16 being located approximately at the vertex 12.

The angle including vertex 12 is bisected by the optical axis of the camera representation 16. Co-linear with this optical axis is a scale 18 which indicates, in a certain ratio, such, for example, as $\frac{1}{4}$ inch to 1 foot, the distance of any point along the scale from the lens of the camera representation 16.

The measuring unit or gauge 10 is so proportioned that the length of an imaginary line, drawn perpendicular to the scale 18 and terminated at each end by one of the edges of the measuring unit, indicates the width of the visual camera field at that distance from the camera lens determined by the point of intersection of the imaginary line and the distance scale 18. Since one end of the imaginary line terminates at one of the edges of the gauge forming the vertex 12, that particular edge is calibrated to indicate the length of the imaginary line at the point where such line meets the edge of the gauge. The ratio of this second scale 20, which thus indicates numerically the width of the camera field at varying distances from the lens of the camera representation 16, is the same as the ratio of the distance scale 18.

A third scale 22, in the same ratio as the two previously mentioned scales, is drawn from the vertex 12 to form an angle with the distance scale 18 which is smaller than the angle formed by the width scale 20 with the distance scale 18. This third scale 22 is so integrated with the distance scale 18 and the width scale 20 that the point at which the imaginary line drawn perpendicular to the distance scale 18 intersects the scale 22 indicates the height of the camera field at a distance from the camera lens determined by the point of intersection of the imaginary line and the distance scale 20. Thus, the measuring unit or gauge 10 instantly indicates, at any selected distance from the lens of the camera, both the width and height of the visual camera field in that particular ratio in which the scales are drawn.

Fig. 2 illustrates a measuring unit or gauge 10', similar in principle to the gauge 10 of Fig. 1, but proportioned and calibrated for a camera representation 16′ having a lens of 14 inches focal length, for instance. The distance scale 18′, the width scale 20′, and the height scale 22′, respectively, correspond in other respects to the distance scale 18, the width scale 20, and the height scale 22 of Fig. 1.

Figure 3:
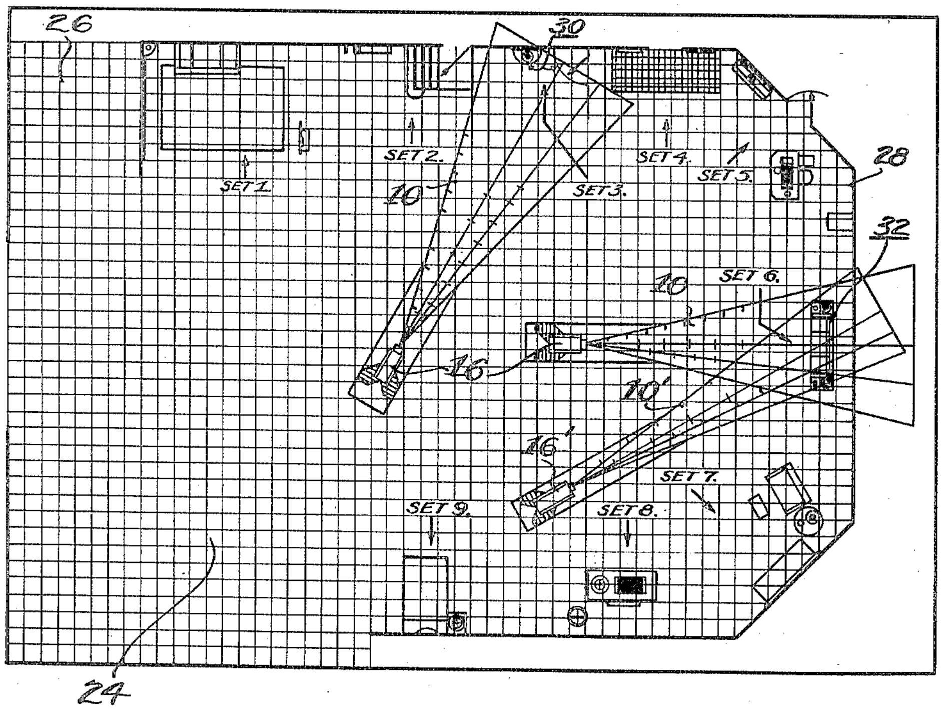
Fig. 3 is a view of a television studio floor plan, showing the manner in which the gauges of Figs. 1 and 2 may be used in conjunction therewith.

Fig. 3 illustrates one manner in which the measuring units or gauges 10 and 10′ of Figs. 1 and 2, respectively, may be employed for one of the purposes hereinabove set forth. A television studio floor plan blank, generally indicated by the reference character 24, is divided into unit squares by the cross-sectional lines 26. The floor plan blank 24 in practice is drawn in the same ratio as that used for the gauges 10 and 10′, but has been shown in Fig. 3 on the scale of ⅛ inch to 1 foot for convenience of illustration.

A number of experimental settings or scenes are drawn or otherwise indicated on the floor plan blank 24. As shown in Fig. 3, these settings may be arranged along a wall or partition 28. One of these settings is generally represented by the reference character 30.

To determine the correct placement for a selected one of the studio cameras, such, for example, as the one having a lens of 8¼ inches focal length, the measuring unit or gauge 10 is placed upon the floor plan blank 24 so that the triangular area of the gauge 10 overlies that portion of the setting 30 which it is desired to visually reproduce. The gauge 10 being transparent, the approximate distance of any component part of the setting 30 from the camera lens may be determined by the point on the distance scale 18 adjacent the most forward portion of that component. By drawing an imaginary line across the gauge 10 at such point on the distance scale 18, the numerical width of the camera field will be indicated by the width scale 20. Furthermore, the point of intersection of this imaginary line and the scale 22 will indicate the corresponding height of the camera field at that particular distance from the camera lens. The propriety of any camera position for including within the visual field of the camera all or any desired portion of the setting 30 may thus be readily determined.

When a satisfactory camera position is decided upon, the location of the camera representation 16 is marked on the floor plan blank 24. When the time arrives for televising that particular scene in the television studio, the camera is merely moved to a studio location corresponding to the camera marking which appears on the floor plan blank 24.

If the numerical width of the camera field is not required, it will be obvious that this portion of the camera positioning operation may be carried out by observing whether or not a particular setting or any selected component thereof falls within the area of the gauge 10 when the camera representation 16 is at any experimental position.

If desired, two or more measuring units may be used together, as shown in the right hand portion of Fig. 3. When so used, one measuring unit or gauge, such as 10 of Fig. 1, is placed upon the floor plan blank 24, and then maneuvered until a satisfactory location for camera representation 16 is obtained with respect to a particular setting, such, for example, as that indicated by the reference character 32. A second measuring unit or gauge, such as 10′ of Fig. 2 (or a duplicate of gauge 10 of Fig. 1, depending upon the focal length of the lens of the second camera) is then placed upon the floor plan blank 24 so that the second measuring unit 10′ overlies the first-placed measuring unit 10. Now, while the position of the first measuring unit 10 remains unchanged, the latter-placed gauge 10′ is maneuvered until a desired location for the second camera representation, such as 16′, is obtained.

Obviously any number of measuring units or gauges may be placed one upon the other to permit a determination of the correct locations for each of the cameras which may be required to televise any particular setting.

Having thus described my invention, I claim:

1. A measuring unit for use in pre-planning the layout of a studio setting, comprising a triangular sheet of relatively transparent material having an extending portion adjacent one vertex thereof on which is represented a camera of fixed focal length, the portion of said representation corresponding to the lens of said camera being located substantially at said one vertex, and a scale, co-linear with the optical axis of said camera, extending from said one vertex to substantially bisect that angle of said triangle, said scale indicating the distance of points therealong from the lens of said camera, said triangle being so proportioned that the length of an imaginary line thereon perpendicular to said scale and terminating at the edges of said triangle will indicate the width of the visual field of said camera at the distance from said lens determined by the point of intersection between said imaginary line and said scale.

2. A measuring unit in accordance with claim 1, further comprising an additional scale set forth on one of the edges of said triangle forming said one vertex, said additional scale numerically indicating the width of the visual field of said camera at the point of intersection of said additional scale and said imaginary line.

3. A measuring unit according to claim 1, further comprising an additional scale for indicating the height of the visual field of said camera at varying distances along the optical axis thereof, said additional scale intersecting said vertex and extending at such an angle relative to the scale indicating varying distances from the lens of said camera that the point of intersection of said additional scale and the imaginary line perpendicular to said distance-indicating scale will indicate, on said additional scale, the height of the visual field of said camera at a distance from said lens represented by the point of intersection of said distance-indicating scale and said imaginary line.

NORVAL R. KELLY.

REFERENCES CITED

The following references are of record in the file of this patent:

UNITED STATES PATENTS

| Number | Name | Date |
|---|---|---|
| 1,519,965 | Hoohannessian | Dec. 16, 1924 |
| 1,622,445 | Jefferson | Mar. 29, 1927 |